United States Patent
Yamanaka et al.

(10) Patent No.: US 8,386,228 B2
(45) Date of Patent: Feb. 26, 2013

(54) MICROCOMPUTER SIMULATOR

(75) Inventors: Atsushi Yamanaka, Kobe (JP);
 Masahiro Maekawa, Kobe (JP);
 Kohichi Kanoh, Kobe (JP); Takashi Higuchi, Kobe (JP)

(73) Assignee: Fujitsu Ten Limited, Kobe (JP)

( * ) Notice: Subject to any disclaimer, the term of this patent is extended or adjusted under 35 U.S.C. 154(b) by 307 days.

(21) Appl. No.: 12/516,472

(22) PCT Filed: Feb. 15, 2008

(86) PCT No.: PCT/JP2008/052559
 § 371 (c)(1),
 (2), (4) Date: Jul. 28, 2009

(87) PCT Pub. No.: WO2008/099931
 PCT Pub. Date: Aug. 21, 2008

(65) Prior Publication Data
 US 2010/0017191 A1    Jan. 21, 2010

(30) Foreign Application Priority Data
 Feb. 15, 2007 (JP) ................................. 2007-035308

(51) Int. Cl.
 *G06G 7/06* (2006.01)
 *G06F 13/00* (2006.01)
(52) U.S. Cl. ................ 703/13; 703/21; 703/24; 703/25; 710/1; 710/100
(58) Field of Classification Search .................... 703/13, 703/24, 25; 710/1, 100
 See application file for complete search history.

(56) References Cited

U.S. PATENT DOCUMENTS

| 3,673,399 | A | * | 6/1972 | Hancke et al. | 708/404 |
| 4,346,452 | A | * | 8/1982 | Groves | 710/11 |
| 4,847,805 | A | * | 7/1989 | Ishii et al. | 703/27 |
| 4,901,249 | A | * | 2/1990 | Shiota | 358/1.16 |
| 5,109,353 | A | * | 4/1992 | Sample et al. | 716/136 |

(Continued)

FOREIGN PATENT DOCUMENTS

| JP | A-6-67931 | 3/1994 |
| JP | A-11-296444 | 10/1999 |

(Continued)

OTHER PUBLICATIONS

Oct. 23, 2012 Office Action issued in Japanese Application No. 2008-558155 (with partial translation).

*Primary Examiner* — Saif Alhija
*Assistant Examiner* — Kibrom Gebresilassie
(74) *Attorney, Agent, or Firm* — Oliff & Berridge, PLC

(57) ABSTRACT

Provided is a microcomputer simulator capable of quickly dealing with change of a target microcomputer to thereby enable a speedy development of software. The microcomputer simulator is a microcomputer simulator for simulating a microcomputer including therein a CPU and a peripheral circuit of the CPU, and includes a mother board including a CPU for executing application software to be processed by the CPU provided in the microcomputer, and an IO board for executing, at an FPGA thereof, processing of the peripheral circuit provided in the microcomputer and IO processing executed by the CPU provided in the microcomputer. The FPGA includes a common memory portion so that the microcomputer simulator updates data stored in the common memory portion through a communication bus provided between the mother board 10 and the IO board, and causes data to be exchanged between the CPU provided in the mother board and the FPGA.

5 Claims, 7 Drawing Sheets

U.S. PATENT DOCUMENTS

| | | | |
|---|---|---|---|
| 5,142,625 A * | 8/1992 | Nakai | 710/260 |
| 5,408,637 A * | 4/1995 | Shimizu | 703/25 |
| 5,467,461 A * | 11/1995 | Nasu et al. | 711/147 |
| 5,625,795 A * | 4/1997 | Sakakura et al. | 711/148 |
| 5,761,482 A * | 6/1998 | Matsui et al. | 703/23 |
| 5,908,455 A * | 6/1999 | Parvahan | 701/29 |
| 5,935,223 A * | 8/1999 | Griffith et al. | 710/38 |
| 6,035,349 A * | 3/2000 | Ha et al. | 710/68 |
| 6,347,294 B1 * | 2/2002 | Booker et al. | 703/28 |
| 6,754,746 B1 * | 6/2004 | Leung et al. | 710/100 |
| 6,883,078 B2 * | 4/2005 | Chen | 711/165 |
| 7,091,598 B2 * | 8/2006 | Fujita et al. | 257/691 |
| 7,283,946 B2 * | 10/2007 | Hiquchi et al. | 703/21 |
| 7,313,729 B2 * | 12/2007 | Chuang et al. | 714/29 |
| 7,539,610 B2 * | 5/2009 | Imada et al. | 703/28 |
| 7,577,560 B2 * | 8/2009 | Imada et al. | 703/24 |
| 7,650,274 B2 * | 1/2010 | Higuchi et al. | 703/21 |
| 2002/0169923 A1 * | 11/2002 | Chen | 711/103 |
| 2004/0031003 A1 * | 2/2004 | Hiquchi et al. | 716/7 |
| 2004/0061147 A1 | 4/2004 | Fujita et al. | |
| 2004/0083234 A1 * | 4/2004 | Higuchi | 707/104.1 |
| 2004/0186938 A1 * | 9/2004 | Imada et al. | 710/100 |
| 2004/0225821 A1 * | 11/2004 | Klein et al. | 710/306 |
| 2005/0039149 A1 * | 2/2005 | Imada et al. | 716/1 |
| 2006/0117274 A1 * | 6/2006 | Tseng et al. | 716/1 |
| 2008/0294421 A1 * | 11/2008 | Leung | 703/25 |
| 2008/0294808 A1 * | 11/2008 | Mahalingam et al. | 710/26 |
| 2010/0042778 A1 * | 2/2010 | Tanguay et al. | 711/105 |

FOREIGN PATENT DOCUMENTS

| | | |
|---|---|---|
| JP | A-2003-167756 | 6/2003 |
| JP | A-2004-13626 | 1/2004 |
| JP | A-2004-234530 | 8/2004 |
| JP | A-2004-320702 | 11/2004 |
| JP | A-2005-166010 | 6/2005 |
| WO | WO 02/057921 A1 | 7/2002 |

* cited by examiner

MICROCOMPUTER SIMULATOR

This application is the U.S. national phase of international application PCT/JP2008/052559, filed on Feb. 15, 2008, which designated the U.S. and claims priority to JP Application No. 2007-035308, filed on Feb. 15, 2007. The entire contents of these applications are incorporated herein by reference.

TECHNICAL FIELD

The present invention relates to a microcomputer simulator suitably usable in, for example, software developing devices for developing or evaluating software incorporated in microcomputers for controlling appliances.

BACKGROUND ART

In situations of intensively accelerated development of the performance and functions of control target appliances, microcomputers incorporated in electronic control devices for controlling the appliances have improved in performance year by year.

For example, for electronic control devices such as electronic control units for controlling engines of vehicles, in the midst of the accelerated development of the performance and functions of the engines, new types of application software (control logics) have been developed in advance considering electronic control devices of the next generation exhibiting superior performance to the performance of the existing electronic control devices.

The control logics developed in advance target, in many cases, microcomputers of the next generation that are expected to improve in performance. However, there are cases where no electronic control devices exist incorporating such microcomputers with improved performance at the time of development of the control logics, and even cases where the microcomputers of the next generation themselves do not exist. Thus, in many cases, there was no way but to develop advanced logics on the basis of the existing microcomputers.

However, in the cases of developing the advanced logics using electronic control devices incorporating the existing microcomputers, problems arise including deficiencies in processability of CPUs of the microcomputers, deficiencies in memory capacity, and further, deficiencies in peripheral resources, making development of highly accurate advanced logics difficult. This has caused hindrances to development of new products, including a delay in development of application software that corresponds to the microcomputers of the next generation.

That is, the microcomputers incorporated in the existing electronic control devices are such that in order to minimize the cost associated with the electronic control devices, CPU performance and peripheral resources are selected to secure optimum specifications for existing systems and then incorporated into a single package. This fails to deal with the need for making changes in the performance and functions when attempting to correspond to new products, unless the microcomputers themselves are changed.

In view of this, patent document 1 proposes a software developing device including three functional blocks: a central block including an application processing function portion that simulates a CPU built in a microcomputer and a communication function portion; a peripheral block connected to the central block through a PCI bus; and an interface circuit block connected to the peripheral block.

The peripheral block includes a simulation microcomputer peripheral device that carries out input-output processing through implementing, on software, a peripheral resource built in the microcomputer, an operation function portion, and a communication function portion. The interface circuit block includes a circuit that is equivalent to hardware other than the microcomputer incorporated in an electronic control unit.

The operation function portion of the peripheral block is provided with a bus controller; the communication function portion of the central block and the bus controller are connected to one another through the PCI bus; and the bus controller and the simulation microcomputer peripheral device are connected to one another through an internal bus, to result in such a configuration that data is transmitted-received between the communication function portion and the simulation microcomputer peripheral device through the PCI bus, the bus controller, and the internal bus.

Referring to FIGS. 2B and 7, this software developing device is such that the central block has mounted thereon an IO driver that serves as software for implementing a function equivalent to a bus connected to an internal resource of the microcomputer, that the central block and the peripheral block are connected to one another through the PCI bus, that the central block has mounted thereon a platform that serves as software for connecting the IO driver and application software to one another, and that the peripheral block has mounted thereon a simulation microcomputer peripheral device composed of FPGA as firmware.

[Patent document 1] Japanese Unexamined Patent Publication No. 2004-234530.

DISCLOSURE OF THE INVENTION

Problems that the Invention is to Solve

The above-described conventional software developing device is such that the CPU is separated from the functions of the microcomputer composed of peripheral resources including an interruption controller and a capture, and that the contents of processing by the CPU, which executes an application program, are allocated to a mother board, which serves as the central block, while the contents of processing by the peripheral resources of the microcomputer are allocated to an IO board, which serves as the peripheral block.

That is, I/O processing (input-output processing, indicated as "microcomputer I/O" in the figure) that is supposed to be executed at the CPU of the microcomputer with respect to the peripheral resources is configured to be executed at the IO driver and the platform of the central block (mother board).

Such I/O processing with respect to the peripheral resources ends up being processing that varies depending on a hardware configuration such as the peripheral resources incorporated in the target microcomputer. This poses such a problem that every time the target microcomputer is changed, the CPU board must conform to the change by replacing the IO driver for executing the I/O processing or replacing the central block (mother board) itself.

In addition, in the above-described conventional software developing device, the platform and the IO driver mounted on the central block (mother board) cannot be completely separated from the application software, so that part of the platform and the IO driver is incorporated in the application software.

Thus, changing the target microcomputer requires laborious work including, in addition to changing the firmware and the IO driver of the peripheral block to conform to the change, changing and replacing the platform and the IO driver mounted on the central block and even the application software. Thus, there is still room for improvement in that the conventional software developing device needs to be so generalized that it eliminates the involvement of changing at least the application software.

In view of the foregoing problems, it is an object of the present invention to provide a microcomputer simulator capable of quickly dealing with change of a target microcomputer to thereby enable a speedy development of software.

Means of Solving the Problems

In order to accomplish the above object, a feature configuration of a microcomputer simulator according to the present invention is as follows. The microcomputer simulator simulates a microcomputer including therein a CPU and a peripheral circuit of the CPU and includes: a mother board for executing application software to be processed by the CPU provided in the microcomputer; an IO board for executing processing of the peripheral circuit provided in the microcomputer and IO processing executed by the CPU provided in the microcomputer; and a bridge portion provided through the mother board and the IO board, the bridge portion exchanging data unique to the microcomputer between the application software executed at the mother board and the IO processing executed at the IO board, wherein the bridge portion converts the data exchange into communication processing independent of the microcomputer.

With the above configuration, the bridge portion carrying out exchange of input-output data between a mother board for simulating the CPU of a simulation target microcomputer and an IO board for simulating a peripheral circuit of the simulation target microcomputer in a form of communication processing converted to be independent of the simulation target microcomputer. Thus, even when the simulation target microcomputer is changed, a corresponding microcomputer can be simulated only by changing the exchanged input-output data.

This eliminates the conventional need for changing the application software and significantly alleviates the laborious processing of, for example, changing the IO driver on the mother board for the simulation peripheral functional block of the IO board.

Effects of the Invention

As has been described hereinbefore, the present invention has made it possible to provide a microcomputer simulator capable of quickly dealing with change of a target microcomputer to thereby enable a speedy development of software.

DESCRIPTION OF REFERENCE NUMERAL

10: Mother board
20: IO board
22: Common memory portion

BEST MODE FOR CARRYING OUT THE INVENTION

A microcomputer simulator according to the present invention will be described below. This microcomputer simulator is implemented as, for example, a software developing device for developing application software of a microcomputer incorporated in an electronic control unit (hereinafter referred to as an "ECU") for controlling a vehicle engine.

It should be noted that the microcomputer simulator according to the present invention finds applications not only in developing application software of ECUs but also in developing a broader range of incorporated software.

Figure 5:
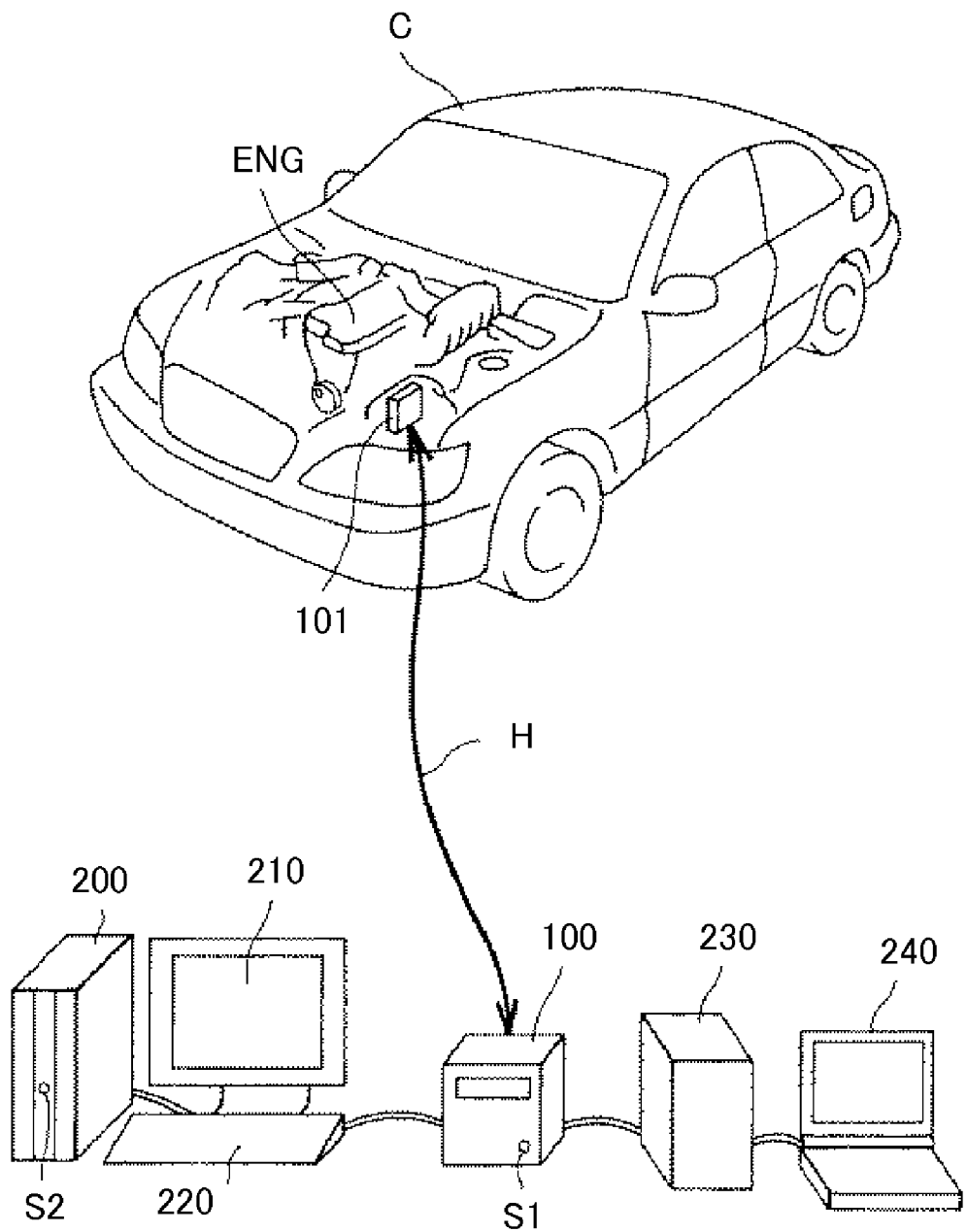
FIG. 5 is a diagram illustrating how the microcomputer simulator according to the present invention is used.

Referring to FIG. 5, an engine control ECU 101 is located near an engine ENG mounted in an engine room of a vehicle C.

A microcomputer simulator (hereinafter referred to as a "software developing device") 100 is used in place of the actual ECU 101 by removing a connector of a signal line connected to the ECU 101 and connecting the signal line to the software developing device 100 through a relay harness H, so that the engine ENG is controlled on the basis of application software executed by the software developing device 100.

The software developing device 100 is connected to a superordinate computer (host computer) 200 including a display 210 and a key board 220 for inputting data. In the figure, S1 and S2 are power switches for activating the software developing device 100 and the host computer 200, respectively. The display 210 monitors the operation state of the software developing device 100, and inputs of setting and change of setting for the software developing device 100 are made through the key board 220.

Other than using the software developing device 100 by directly connecting it to the vehicle C as described above, the software developing device 100 may be connected to a vehicle driving condition generating device 230 for simulating various driving conditions of the vehicle, where the application software of the microcomputer incorporated in the ECU can be developed even when the vehicle C does not exist.

The vehicle driving condition generating device 230 executes application software for simulating the engine under control of a personal computer 240 and outputs a signal corresponding to the driving condition to the software developing device 100.

The configuration of the ECU 101 will be described below.

Figure 4:
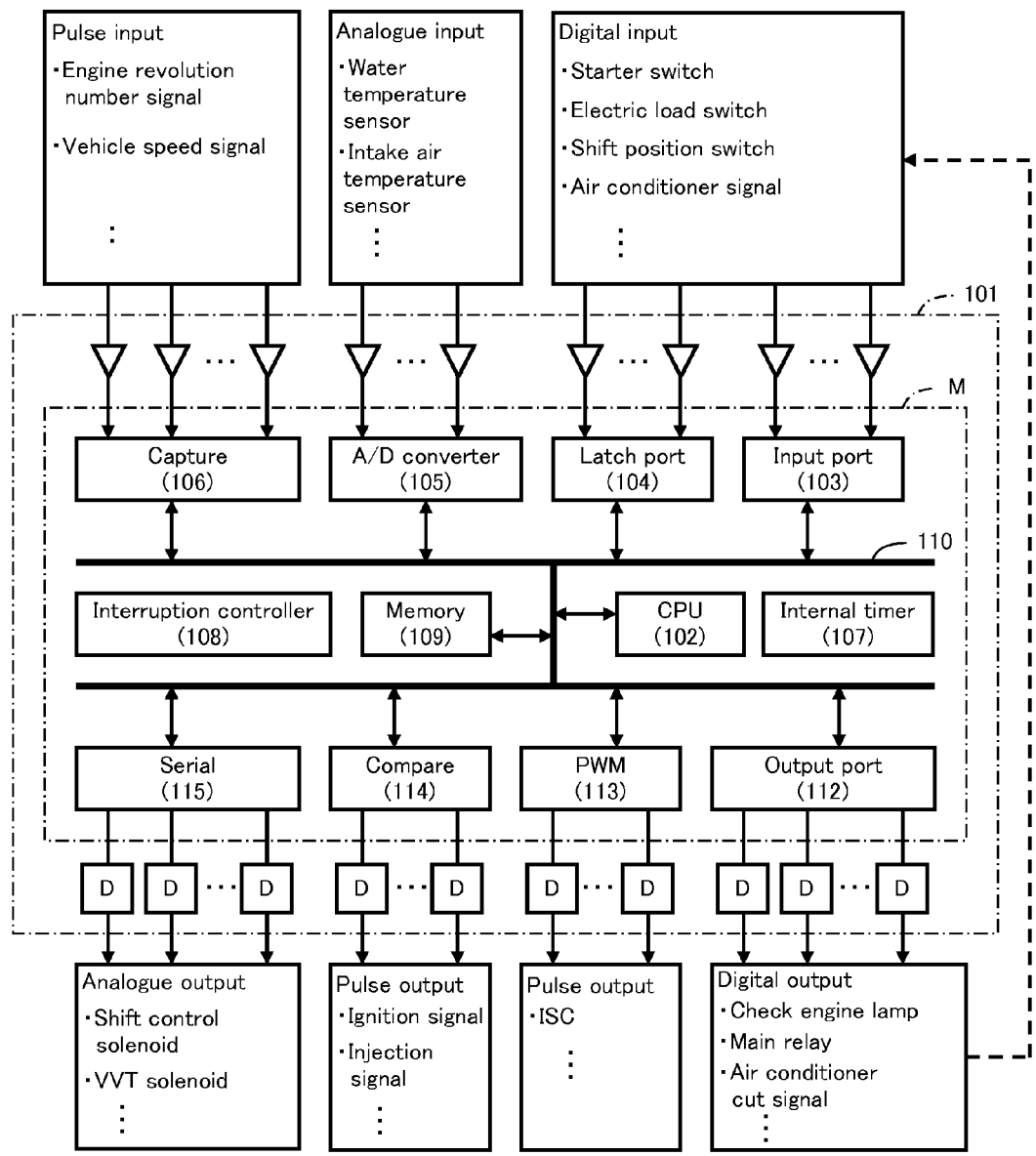
FIG. 4 is a configuration diagram of input-output resources of the microcomputer.

Referring to FIG. 4, the ECU 101 accepts input of pulse inputs including an engine revolution number signal and a vehicle speed signal, analogue inputs from a water temperature sensor, an intake air temperature sensor, and the like, and digital inputs including a starter switch, an electric load switch, a shift position switch, and an air conditioner signal.

The ECU 101 includes an input circuit for processing these input signals, a microcomputer M for processing the signals input from the input circuit, and a driver D for amplifying and outputting the signals processed at the microcomputer M.

The signals output from the ECU 101 include analogue control signals (analogue outputs) to a shift control solenoid and a VVT (variable valve timing) solenoid, pulse control signals (pulse outputs) including an ignition signal and a fuel injection signal, pulse control signals (pulse outputs) for ISC (idle speed control), and digital control signals (digital outputs) including a check engine lamp signal, a main relay signal, and an air conditioner stop signal.

The microcomputer M stores in a single package a memory 109 including a ROM for storing application software and a RAM used for operation processing, a CPU 102 for executing the application software, and peripheral resources for carrying out input-output control.

The peripheral resources include input resources and output resources. As the input resources, an input port 103 and a latch port 104 that deal with the digital signals, an A/D converter 105 that deals with the analogue signals, a capture 106 that deals with the pulse inputs, and the like are provided, while as the output resources, an output port 112 that outputs the digital outputs, a PWM (Pulse Width Modulator) 113 and a compare 114 that output the pulse outputs, a serial 115 that outputs the analogue signals, and the like are provided.

These peripheral resources are connected to the memory 109 and the CPU 102 through an internal bus 110. In addition to these peripheral resources, an internal timer 107, an interruption controller 108, and the like are provided inside the microcomputer M.

When a signal from any of the sensors and switches indicating driving conditions of a vehicle is input to the ECU 101, the signal is subjected to signal processing at the input circuit and input to the microcomputer M. The input signal is converted into a CPU value at the input peripheral resources so that the memory 109 and the CPU 102 serving as operation portions detect a driving condition on the basis of the CPU value, and that an output demanding signal corresponding to the driving condition is created.

The output demanding signal is converted into an output signal at the output peripheral resources and output out of the microcomputer M. In accordance with this output signal, actuators mounted in the vehicle are activated by the driver D, and a result of this output control is reflected on an input signal from the vehicle, as indicated by the broken line.

The software developing device 100 according to the present invention serves as an emulator for simulating the above-described ECU 101.

Figure 1:
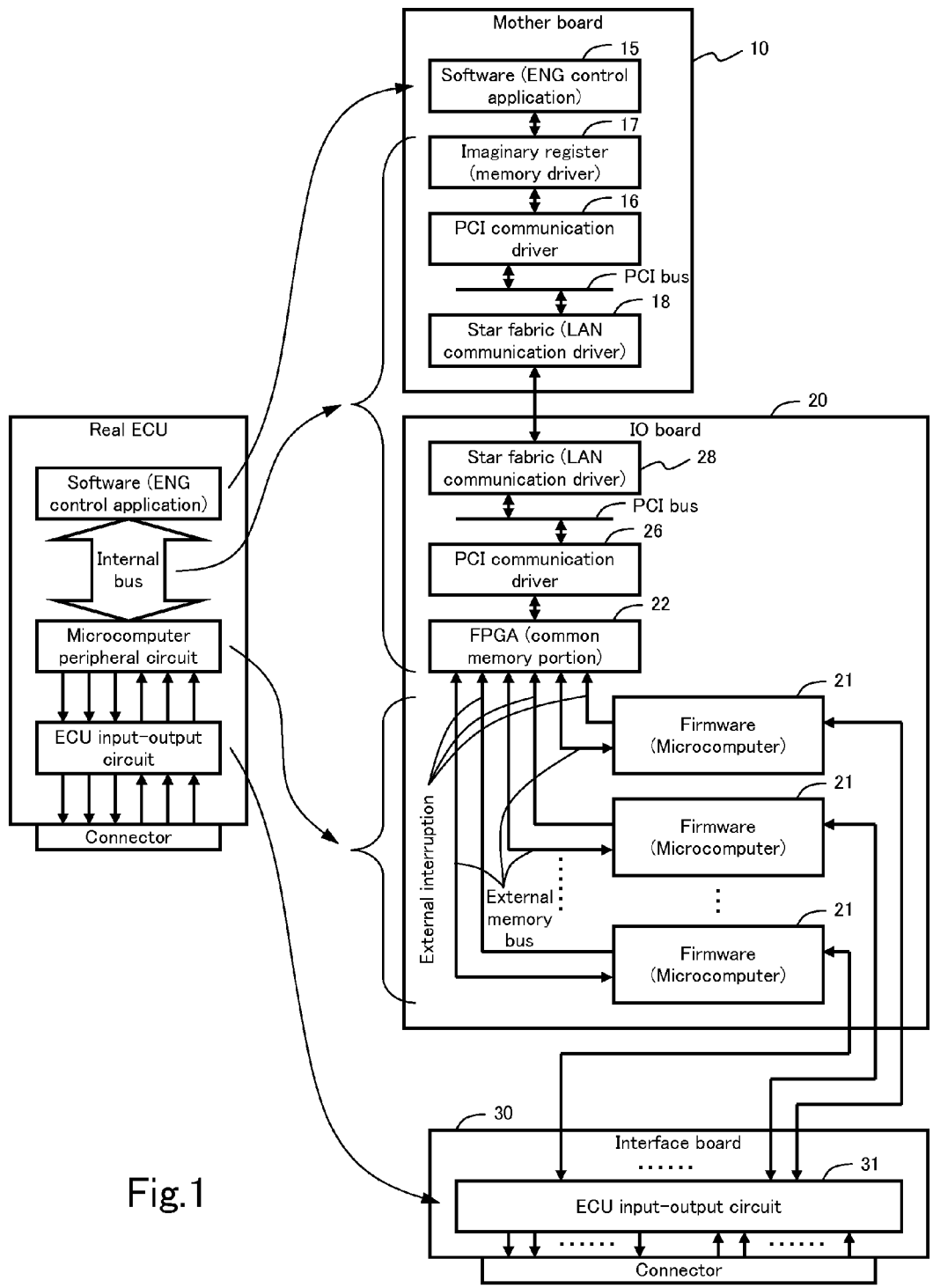
FIG. 1 is a functional block configuration diagram describing an entire configuration of a microcomputer simulator according to the present invention.
Figure 2A:
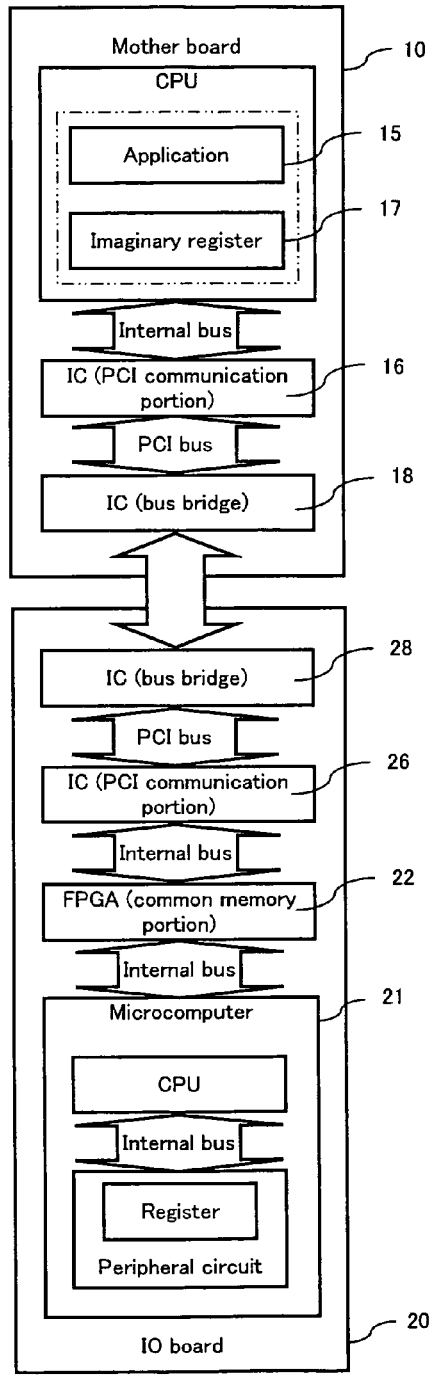
FIG. 2A is a functional block configuration diagram describing IO processing by the microcomputer simulator according to the present invention.

Referring to FIGS. 1 and 2A, the software developing device 100 is configured to include the mother board 10, the IO board 20, and an interface board 30.

The mother board 10 includes a high-functional CPU for executing application software. The IO board 20 includes simulated peripheral functional blocks that simulate a plurality of CPU peripheral resources constituting a target microcomputer. The interface board 30 includes a simulated circuit for an input-output peripheral circuit provided outside the target microcomputer.

The mother board 10 and the IO board 20 are connected to one another through a PCI bus serving as a communication bus, and the IO board 20 and the interface board 30 are connected to one another through a plurality of input-output signal lines.

The mother board 10 executes application software executed by a CPU provided in a simulation target microcomputer.

The mother board 10 mounts thereon a high-speed and high-functional CPU of several GHz used in general-purpose personal computers, a memory, a PCI bus interface circuit, and a high-speed LAN interface circuit such as a star fabric serving as a bridge to relay the PCI bus.

As the bridge to relay the PCI bus, a PCI bus bridge or the like may be suitably used instead of the star fabric.

The memory on the mother board 10 stores application software 15 for engine control, a PCI communication driver 16, a memory driver 17 that has access to a common memory portion, which is described later, through the PCI, a LAN communication driver 18, and the like.

The IO board 20 executes processing when serving as a peripheral circuit (peripheral resource) provided in the simulation target microcomputer, and IO processing executed by the CPU provided in this microcomputer, that is, input-output processing with respect to the peripheral resources.

The IO board 20 mounts thereon a CPU that operates at a hundred and several tens of MHz; a memory; a plurality of pieces of firmware 21 serving as simulation peripheral circuits for simulating a timer circuit, an interruption control portion, input resources, and output resources of the target microcomputer; a common memory portion 22 serving as an internal bus for connecting the CPU of the microcomputer to the input and output resources; a PCI bus interface circuit; and a high-speed LAN interface circuit such as a star fabric serving as a bridge to relay the PCI bus.

The memory on the IO board 20 stores a PCI communication driver 26, a LAN communication driver 28, and the like.

The common memory portion 22 is composed of a FPGA (Field Programmable Gate Alley) including a plurality of registers storing control data exchanged between the common memory portion 22 and the firmware 21 and input-output data exchanged between the common memory portion 22 and the interface board 30.

It should be noted that the FPGA is an example of a hardware processing portion for executing the IO processing executed by the CPU provided in the microcomputer, and that the common memory portion 22 may not necessarily be composed of the FPGA but may be composed of some other known hardware circuit such as ASIC.

Such a configuration is employed that the common memory portion 22 stores, through an interruption signal line and an external memory bus (memory control bus), control data such as interruption that occurs at the firmware 21 and activates operations executed by the application software, and that the mother board reads the control data stored in the common memory portion 22 through the PCI bus.

The common memory portion 22 stores, through the PCI bus, output data that is a result of an operation executed by the application software on the basis of the control data read by the mother board, and an output signal corresponding to the output data is output to the interface board 30 through a piece of firmware 21.

The firmware 21 each use an existing microcomputer as a core and are configured to serve as, on the basis of a control program of this microcomputer, peripheral resources including the above-described input port 103 and the latch port 104, the A/D converter 105, the capture 106, the output port 112, the PWM (Pulse Width Modulator) 113, the compare 114, the serial 115, and the internal timer 107.

While the peripheral resources each may be composed of an FPGA or a hardware circuit, use of an existing microcomputer makes it easy to constitute the different peripheral resources, thereby enabling the functions to be changed in a flexible and rapid manner in accordance with the target microcomputer.

In the memory on the mother board 10, a data storing area for serving as an imaginary register is provided. The imaginary register simulates an internal register used by the CPU of the simulation target microcomputer for controlling the peripheral resources.

The firmware 21 implemented as peripheral resources include the above-described timer circuit, interruption control portion, input resources, and output resources. Thus, control registers for executing IO processing with respect to the peripheral resources are set as imaginary registers, such as a setting register and a control register for a timer value with respect to the time circuit, an interruption control register with respect to the interruption control portion, and a control register and an input-output data register with respect to the input-output resources.

The application software 15 and the memory driver 17 are constituted in a mutually independent manner.

Figure 3:
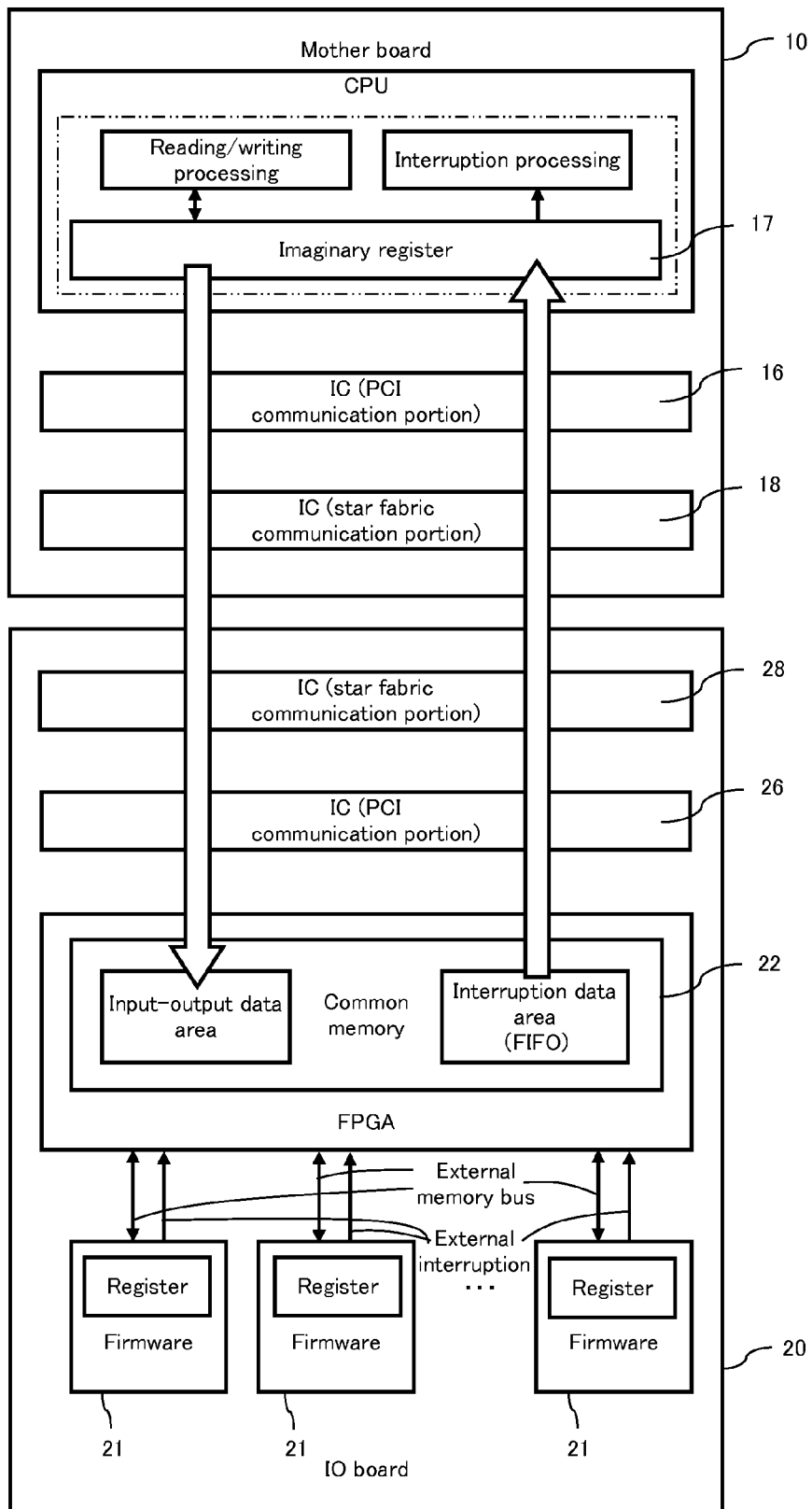
FIG. 3 is a diagram describing exchange of data between an imaginary register and a common memory portion.

That is, referring to FIG. 3, a control signal read from the common memory portion 22 by the memory driver 17 is written to the imaginary register and then forwarded to the application software 15 through this imaginary register. As a result, output data operated at the application software 15 is written to the imaginary register, and then the output data written to the imaginary register is stored in the common memory portion 22 by the memory driver 17.

When event such as counting up of the timer and input processing with respect to an input signal occurs, each piece of firmware 21 notifies the FPGA of occurrence of the event through the interruption signal line.

The FPGA stores code data corresponding to the kind of the event in an interruption data area of the common memory portion 22 while at the same time storing, in an input-output data area of the common memory portion 22, input data obtained from the firmware 21 through the external memory bus.

In order to transmit the code data stored in the interruption data area to the mother board 10 on a FIFO basis, the FPGA activates the PCI communication driver 26 and transmits the code data to the memory driver 17, which is on the side of the mother board 10, through the LAN communication driver 28.

When the code data is written to the imaginary register from the memory driver 17, an interruption processing program, among the application software 15 of the mother board 10, that corresponds to the code data is activated.

The interruption processing program activates the PCI communication driver 16, reads the input data stored in the input-output data area of the common memory portion 22 through the LAN communication driver 18, and writes the input data to the imaginary register, so that predetermined operation processing executed by the application software is activated on the basis of the input data.

That is, the events that occurred at the firmware 21 are sequentially written to the imaginary register of the mother board 10 on a FIFO basis, so that corresponding pieces of application software are activated to read necessary data from the common memory portion 22.

Upon creating data to output by the operation processing, the application software writes this output data to the imaginary register and activates the PCI communication driver 16 to write the output data to the input-output data area of the common memory portion 22 through the LAN communication driver 18.

When the output data is written to the common memory portion 22, the FPGA of the IO board 20 outputs this data to a corresponding piece of firmware 21 through the external memory bus.

That is, the common memory portion 22, which is provided on the IO board 20, and the communication buses 16, 18, 28, and 26, which are provided between the mother board 10 and the IO board 20, constitute a bridge portion. The bridge portion updates data stored in the common memory portion 22 through the communication buses to carry out data exchange between the mother board 10 and the IO board 20.

The bridge portion is provided through the mother board 10 and the IO board 20 and carries out exchange of data unique to a simulation target microcomputer in a form of communication processing converted to be independent of the microcomputer, the unique data being exchanged between the application software executed at the mother board 10 and the IO processing executed at the IO board 20.

The interface board 30 includes a port allocation conversion board and an ECU input-output circuit 31 composed of a plurality of standard circuit boards and function boards inserted to a connector of the port allocation conversion board, and is configured to implement any number of input-output circuits depending on the combination of a standard circuit board and a functional board inserted to the port allocation conversion board.

The standard circuit boards are each composed of a digital signal circuit including a driver circuit for outputting a lighting signal of a warning lamp and a driver circuit and a buffer circuit for inputting-outputting serial signals such as and a CAN bus, and the function boards are each composed of a power train outputting circuit, an analogue signal inputting-outputting circuit, and an inputting-outputting processing circuit including a signal-processing low-functional microcomputer for inputting-outputting an injection signal, an ignition signal, an electronic throttle control signal, and the like with respect to an engine.

Figure 6:
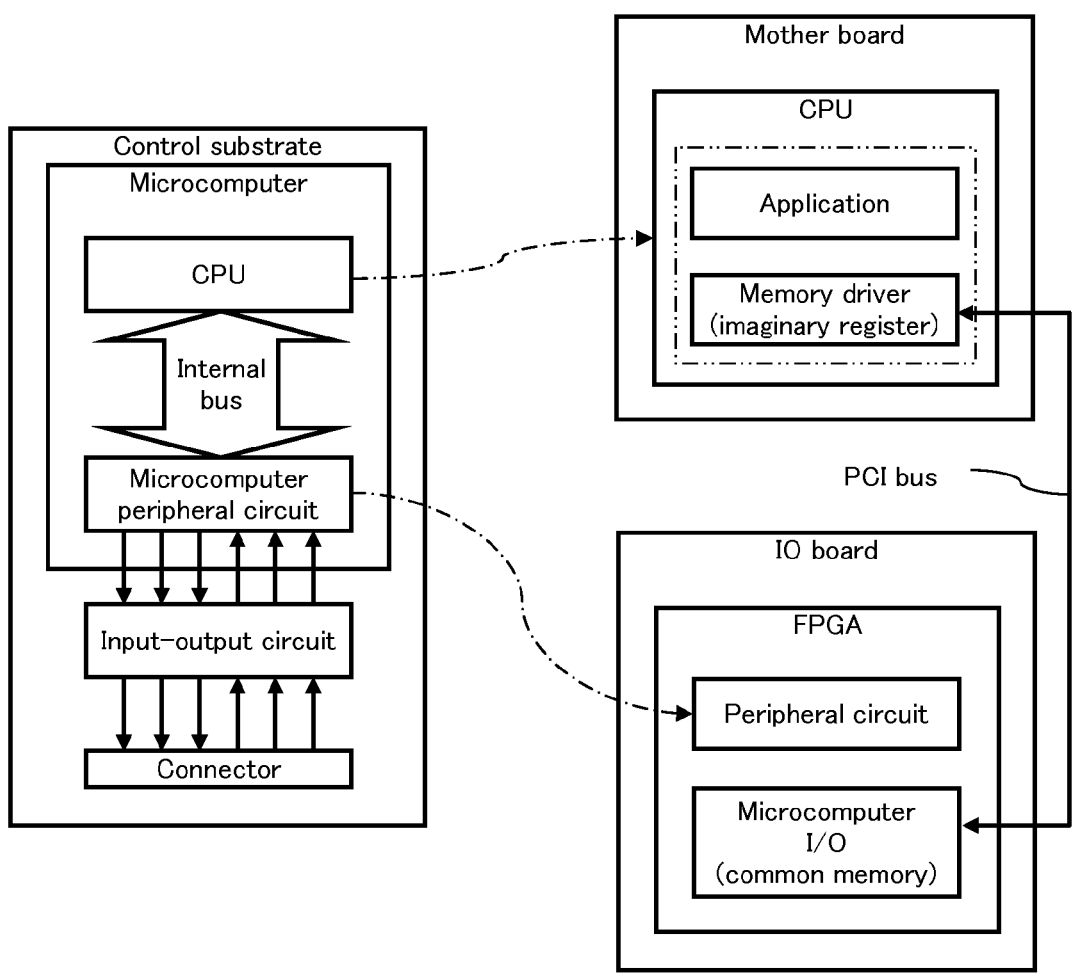
FIG. 6 is a main-parts block configuration diagram describing the microcomputer simulator according to the present invention.
Figure 7:
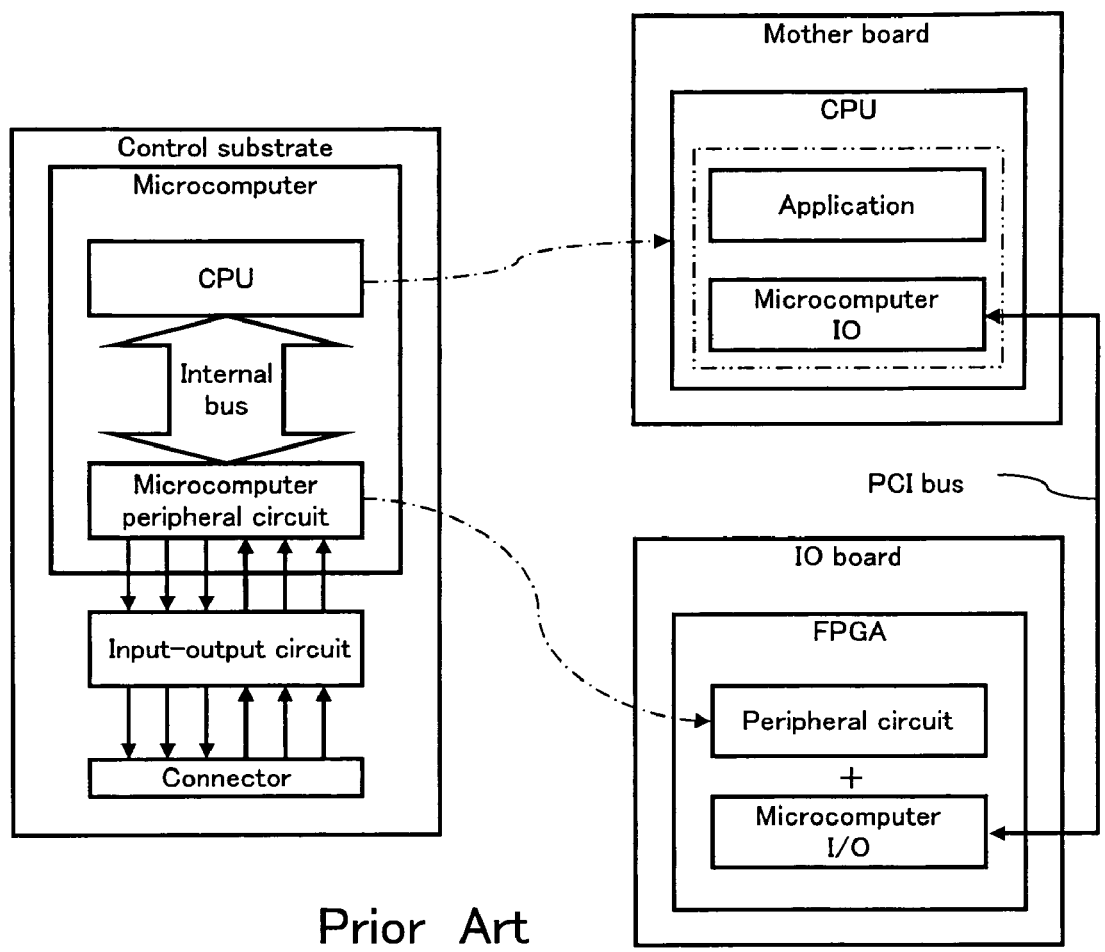
FIG. 7 is a main-parts block configuration diagram describing a conventional microcomputer simulator.

That is, referring to FIG. 6, the mother board 10 and the IO board 20 simulate the target microcomputer, and the interface board 30 simulates the inputting-outputting circuit of the microcomputer, and the software developing device 100 is configured to be connectable to the control target engine through the interface board 30. This configuration simulates the actual environment of the ECU by which the application software is executed.

The basic operation of above-described software developing device 100 will be described.

The application software carries out two types of processing: time synchronous processing (time-related interruption processing) and non-time synchronous processing.

The time synchronous processing does not depend on an external condition and is executed at predetermined intervals, and the non-time synchronous processing occurs depending on an external condition, that is, the driving condition of the engine.

The non-time synchronous processing includes, for example, interruption processing with an engine speed signal, a vehicle speed signal, a fuel injection timing signal, an ignition timing signal, or the like. Assuming that an incidence that changes randomly depending on such an external condition is referred to as an event, the non-time synchronous processing is also such processing that detects information of an event occurring due to an external condition and is executed synchronously with the event.

For the CPU on the mother board 10 to serve as a CPU of an imaginary microcomputer for executing the above-described time synchronous processing and non-time synchronous processing, the memory on the mother board 10 is provided with an imaginary register area for causing a time interruption and a non-time interruption to occur and for storing input and output data and the like, resulting in such a configuration that the data on the common memory portion 22 is written to the imaginary register through the memory driver 17, and that the data written to the imaginary register by the CPU on the mother board 10 is written to the common memory portion 22 through the memory driver 17.

The application software is provided with a plurality of interruption routines that operate when prompted by the external event written to the common memory portion 22, that is, by an interruption flag set in the common memory portion 22 by the timer, engine revolution signal, vehicle speed signal, communication signal, or the like that occurs at the firmware, so that the above-described time synchronous processing and non-time synchronous processing are executed in accordance with the interruption flag.

That is, when there is at least one interruption flag set in the common memory portion 22 and written to the imaginary register through the memory driver 17, IO data at this time is read from the imaginary register through the memory driver 17; part of corresponding application software is activated; the interruption flag is reset while predetermined operation processing is executed; and resulting output data is written to the imaginary register.

The output data written to the imaginary register is written to a predetermined area of the common memory portion 22 of the IO board 20 by the memory driver 17, and the value of the output data is output to the firmware 21, which is a simulation peripheral functional block.

In the case where a large amount of data is transmitted and received, a burst transfer is carried out to improve communication efficiency. Bit data for which the speed of the port and the latch is not demanding are transmitted and received collectively at pre-processing and post-processing of the memory driver.

When the external event or the timer interruption detected at the firmware 21 is stored as an interruption flag in the common memory portion 22, which is composed of FPGA, then the memory driver reads the interruption flag, thereby sequentially executing corresponding application software.

The interruption flag (code data) written from each piece of the firmware 21 to the common memory portion 22 is set independently and written to the imaginary register on a FIFO basis by the memory driver 17, so that the application software sequentially executes corresponding interruption processing. In this regard, the FPGA may be provided with a control portion for controlling interruptions from the firmware 21 in such a manner that the interruptions are ordered according to priority and it is after an application with respect to a first occurring interruption ends that the other pieces of firmware 21 can set their interruption flags.

In the above-described software developing device, such a configuration may be employed that at least the mother board 10 and the IO board 20 are provided separately, e.g., incorporated in different racks, and connected to one another through a bridge such as a star fabric to relay the PCI bus. This configuration provides for effective use of existing hardware resources in that the software developing device is implemented using new application software mounted in the mother board 10 and using existing ECUs instead of the IO board 20 and the interface board 30.

In the case of incorporating the mother board 10 and the IO board 20 into a single rack, they may be connectable directly to one another using the PCI bus, without mediation of the bridge.

The above configuration of the microcomputer simulator is described solely by way of example and the specific configurations of the constituents may be modified in accordance with a system to establish within a range where the advantageous effects of the present invention are exhibited.

Taking FIG. 2A as an example, a star fabric, a PCI bus bridge, or the like may be used as bus bridges 18 and 28. In addition, the common memory portion 22 may be composed of an ASIC, a CPU, a peripheral circuit, even a microcomputer, or the like, instead of the FPGA. Further, the microcomputer serving as the firmware 21 for implementing a peripheral resource may be substituted by an FPGA, an ASIC, or the like.

Figure 2B:
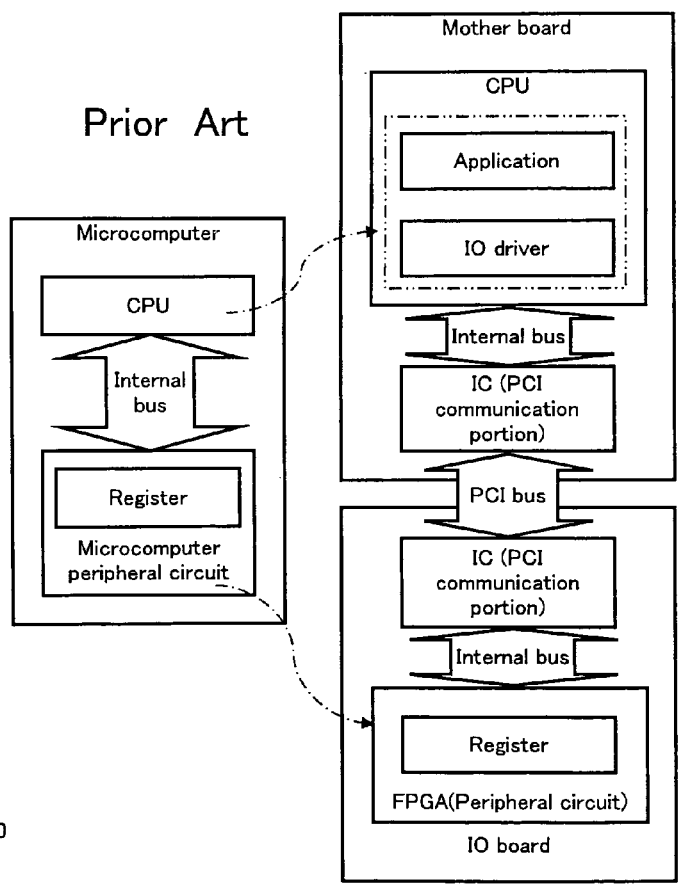
FIG. 2B is a main-parts block configuration diagram describing IO processing by a conventional microcomputer simulator.

With the conventional configuration shown in FIG. 2B, when the target microcomputer is changed, it was essential to, in addition to changing the IO board, substantially change I/O processing with respect to the peripheral resources (peripheral circuits) set by the IO driver on the mother board and to change application software accordingly.

By contrast, the present invention eliminates the need for changing the application and the like on the mother board in that as shown in FIG. 2A, when, in response to a change and the like of the firmware 21 serving as a peripheral resource provided on the IO board 20, a change or addition is made to data allocation with respect to the peripheral resources defined by the common memory portion 22, then it is only necessary to, in response to the change or addition, carry out matching of the memory driver serving as an interface driver for the common memory and the imaginary register.

As has been described hereinbefore, when the target microcomputer is changed, the present invention eliminates the need for substantially changing the IO driver and the platform, which causes the conventional problem of having to change the application software on the mother board. Instead, the present invention easily deals with the change of the target microcomputer mainly by changing the IO board 20.

The invention claimed is:

1. A microcomputer simulator for simulating a microcomputer including therein a first CPU and a peripheral circuit of the first CPU, the microcomputer simulator comprising:
   a mother board including a second CPU for executing application software to be processed by the first CPU, a first PCI communication portion connected to second CPU via a first internal bus in the mother board, a first bus bridge portion connected to the first PCI communication portion via a first PCI bus, and a memory storing the application software; and
   an IO board including a simulation peripheral circuit for simulating processing of the peripheral circuit provided in the microcomputer and a hardware processing portion for executing IO processing executed by the first CPU, a second PCI communication portion connected to the hardware processing portion via a second internal bus on the IO board, and a second bus bridge portion connected to the second PCI communication portion via a second PCI bus and connected to the first bus bridge portion, wherein:
   the hardware processing portion of the IO board comprises:
     a common memory portion;
     the microcomputer simulator causes data to be exchanged between the second CPU provided in the mother board and the hardware processing portion of the IO board by updating data stored in the common memory portion through: (1) the first PCI bus connecting the first PCI communication portion in the mother board and (2) the second PCI bus connecting the second PCI communication portion in the IO board;
     the first and second bus bridge portions carry out exchange of unique data dependent on configurations of the first CPU and peripheral resources, which are both incorporated in the microcomputer in a form of communication processing converted to be independent of the configuration of the peripheral resources' hardware that is incorporated in the microcomputer, the unique data being exchanged between the application software executed in the mother board and the IO processing executed in the IO board via the second PCI bus;

a storing area for an imaginary register that simulates an internal register used by the first CPU to control the peripheral resources is provided in the memory on the mother board; and a memory driver is stored in the memory: for reading data from the common memory portion, writing the data to the imaginary register, forwarding the data to the application software through the imaginary register, reading the data forwarded from the application software to the imaginary register, and writing the data to the common memory portion.

2. The microcomputer simulator according to claim 1, wherein the simulation peripheral circuit is composed of an existing microcomputer.

3. The microcomputer simulator according to claim 1, wherein the mother board and the IO board are provided separately and connected to one another through a relay bridge for the first PCI bus and the second PCI bus.

4. The microcomputer simulator according to claim 1, wherein the IO board is connected to an interface board for simulating an input-output peripheral circuit of the microcomputer, whereby the interface board is connectable to a control target.

5. The microcomputer simulator according to claim 1, wherein the common memory portion stores control data for activating operations occurring at the simulation peripheral circuit and executed by the application software, and the mother board reads the control data stored in the common memory portion through the PCI bus and the second PCI bus.

* * * * *